Dec. 30, 1969   J. G. HARTMANN   3,486,479
MAGNETIC INDICATOR OF ANGULAR MOVEMENT OF A ROTARY BODY
Filed Oct. 14, 1966   2 Sheets-Sheet 1
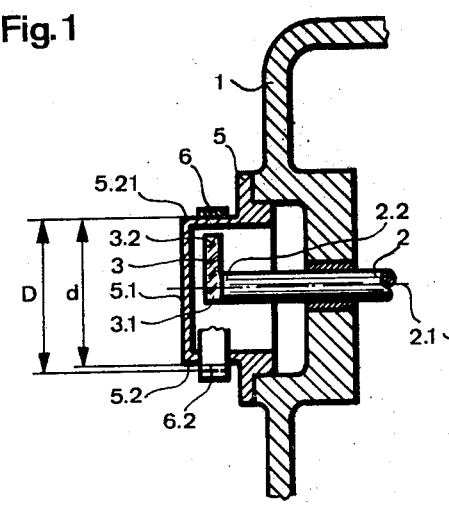
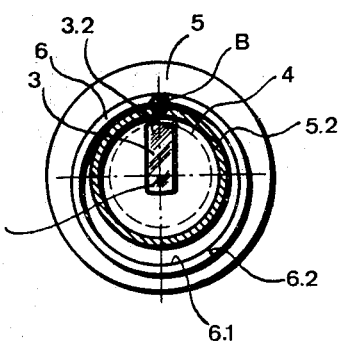
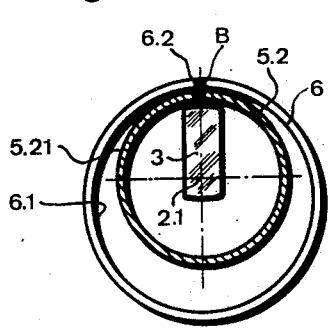
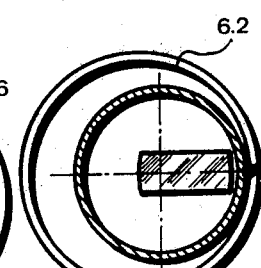
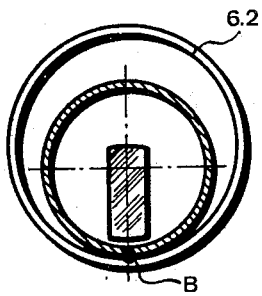
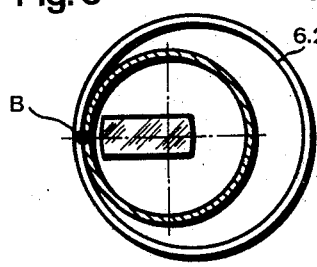
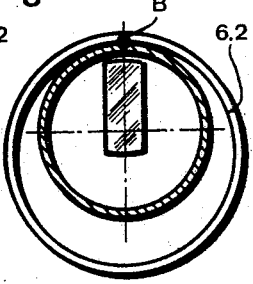
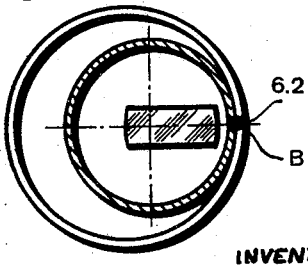
INVENTOR
JOHANN GEORG HARTMANN
BY *McGlew and Toren*
ATTORNEYS Dec. 30, 1969  J. G. HARTMANN  3,486,479
MAGNETIC INDICATOR OF ANGULAR MOVEMENT OF A ROTARY BODY
Filed Oct. 14, 1966  2 Sheets-Sheet 2

INVENTOR.
JOHANN GEORG HARTMANN
BY
McGlew & Toren
ATTORNEYS.

United States Patent Office 3,486,479
Patented Dec. 30, 1969

3,486,479
MAGNETIC INDICATOR OF ANGULAR MOVE-
MENT OF A ROTARY BODY
Johann G. Hartmann, Hergiswil, Switzerland, assignor to
Inventio Aktiengesellschaft, Hergiswil, Switzerland
Filed Oct. 14, 1966, Ser. No. 586,796
Int. Cl. G01p 13/00
U.S. Cl. 116—115                                    17 Claims

ABSTRACT OF THE DISCLOSURE

A direction of rotation indicator for a glandless circulating pump including a magnet which is rotatable in a sealed housing with the rotor shaft. A pole of the magnet, spaced from the axis of the shaft, follows a first circular path during rotation of the shaft. The indicating member engages an exterior surface of the housing and rolls along a second circular path thereon which is concentric with the axis of the shaft and has a fixed constant distance from the first circular path. The diameter of the rolling circumference of the indicator differs from that of the second circular path.

---

This invention relates to devices for indicating the state of movement and direction of rotation of a rotary body and, more particularly, to a magnetic indicating device for indicating the state of movement and the direction of rotation of a rotary body enclosed in a gas or liquid filled sealed housing.

After installation, inspection, or re-starting after a prolonged standstill, drive devices generally must be checked for correct functioning. At this time, it is necessary to control the rotation and direction of rotation of rotatable drive parts. If the rotatable drive parts are contained in an enclosed housing, the performance of this verification is not readily possible, and special means must be provided to indicate the state of movement and the direction of rotation. This is the case, for example, with glandless circulating pumps where the rotor and the rotor shaft of the drive motor are enclosed in a waterproof housing.

Various indicating devices for indicating the state of movement and direction of rotation of a rotary body in a sealed housing are known, and especially those operating on a magnetic principle have found commercial acceptance. These magnetic indicating devices include a permanent magnet attached to the rotary body as close as possible to an outer wall of the housing, and acting on an indicating member of soft iron movably mounted outside the housing. The permanent magnet is usually fastened on the end face of a shaft which is opposite a non-magnetic part of the housing. On the outer side of this housing part, the indicating member is provided in the form of a pin, a pointer, or a disk. Under the action of torque produced on the eddy current principle, the indicating member tries to follow the rotary movement of the permanent magnet.

In accordance with one known principle, the indicating member is simply placed on the non-magnetic housing part and attracted thereagainst by the permanent magnet. A disadvantage of this arrangement resides in the fact that the frictional force occurring during rotation of the indicating member is not controllable. At a certain speed of rotation of the permanent magnet, therefore, the speed of rotation of the indicating member may vary from approximately synchronism to complete standstill, so that there is no reliable and well-visible indication.

In accordance with another known principle, the indicating member is mounted for rotation about an axis to avoid high friction losses, and revolves approximately synchonously with the permanent magnet. At high angular velocities of the rotary body, however, it is very difficult to observe the direction of rotation of the indicating member. Additionally, the mounting of the indicating member is rather expensive.

It has furthermore been proposed to limit the rotation of the indicating member by abutments or stops. The end or limit position of the indicating member then indicates the direction of rotation of the rotary body, this position being maintained, however, when the rotary body comes to a stop. To avoid this disadvantage, springs have been installed which tend to bias the indicating member to a position immediate its two limits of movement. Apart from the relatively high expense for this arrangement, a disadvantage is that the indicating member continuously vibrates.

An object of the present invention is to provide an indicating device for the state of movement and direction of rotation of a rotary body enclosed in the housing, and which operates on the magnetic principle but avoids the mentioned disadvantages of known indicating devices of this kind.

Another object of the invention is to provide an indicating device for the state of movement and direction of which includes a magnet mounted on the rotary body and having poles which are non-symmetrical with respect to the axis of rotation of the rotary body, the permanent magnet acting on an indicating member of magnetically permeable material, such as soft iron, movably arranged outside the housing.

A further object of the invention is to provide such an indicating device as just-mentioned in which a roll-off path is arranged on the outside of the housing and near the circular path described by one pole of the rotating magnet, and at a constant distance from the circular path.

Still another object of the invention is to provide, in an indicating device of the type just-mentioned, a rotation symmetrical roll-off body with a well-visible marking having a roll-off circumference different from the circumference of the roll-off path.

A further object of the invention is to provide an indicating device including such a roll-off path and a roll-off body and in which the roll-off body, under the magnetic attraction of the rotating magnet, is rolled around on the roll-off path in a planetary or epicyclic manner.

For an understanding of the principles of the invention, reference is made to the following description of typical embodiments thereof as illustrated in the accompanying drawings.

In the drawings:

FIG. 1 is a sectional view of an indicating device embodying the invention and wherein the indicating member is a ring rolling off on a circular track on the outside of a cylinder;

FIG. 2 is a side elevational view, partly in section, looking from the left of FIG. 1;

FIGS. 3–8 are side elevation views, partly in section, illustrating the indicating device of FIG. 1 and FIG. 2 in different operational positions;

Figure 9:
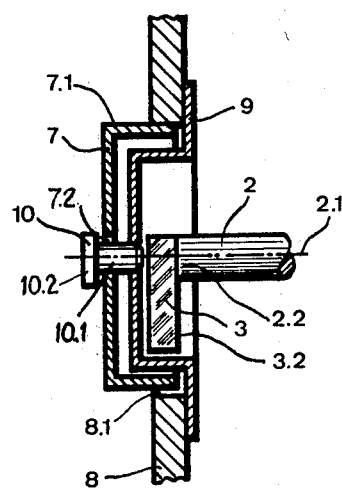
FIG. 9 is a view similar to FIG. 1 illustrating an indicating device embodying the invention and wherein the indicating member is a hood rolling around a bore in a housing.

Referring to FIGS. 1 and 2, there is illustrated therein a housing 1 having a rotary body rotatably mounted therein and in the form of a shaft 2 rotatable about its axis 2.1. A permanent magnet 3 has poles 3.1 and 3.2, pole 3.1 being fastened to the end 2.2 of shaft 2 and pole 3.2 describing a first circular path 4 during rotation of the shaft. Permanent magnet 3 is contained inside a housing cover 5 which has a cylindrical shoulder 5.2 of nonmagnetic material enclosed by a cover 5.1. The cylindrical shoulder 5.2 is closely adjacent orbit 4 and at a constant distance therefrom, and defines a second circular path.

The indicating member 6 is a cylindrical ring of paramagnetic soft iron whose inside diameter D is somewhat greater than the outside diameter $d$ of cylindrical shoulder 5.2. The cylindrical outer periphery 5.21 of shoulder 5.2 serves as a roll-off or roll-around circular path for ring 6, and respectively for the inner cylindrical surface 6.1 of ring 6. Ring 6 has a marking or indicia 6.2, and B indicates the point of contact between ring 6 and shoulder 5.2.

The mode of operation of the indicating device shown in FIGS. 1 and 2 will be clear from reference to FIGS. 3–8. For greater clarity these figures illustrate only the permanent magnet 3 revolving clockwise, the cylindrical shoulder 5.2 of housing cover 5 and the cylindrical ring 6. For a better comprehension, the ratio of the two diameters D and $d$ has been selected to be relatively large such as, for example, 5:4.

In the starting position shown in FIGS. 1, 2 and 3, permanent magnet 3 is directed vertically upward and ring 6 is pulled vertically downward by magnet 3 and pressed against cylindrical shoulder 5.2 so that the contact point B is vertically above shaft axis 2.1. In FIG. 3, marking or indicia 6.2 of ring 6 is also located vertically above shaft axis 2.1, or at the 12:00 o'clock position. During rotation of magnet 3 in clockwise direction, contact point B moves synchronously with magnet 3 without ring 6 sliding on shoulder 5.2. The inner periphery 6.1 of ring 6 rolls around the outer periphery 5.21 of shoulder 5.2. As the circumference of the outer periphery 5.21 of shoulder 5.2 is smaller than the circumference of the inner periphery 6.1 of ring 6, the latter also rotates clockwise but more slowly than magnet 3. The rotation of ring 6 is recognizable by migration of indicia 6.2 thereon.

When magnet 3 has rotated 90° out of its initial position, marking 6.1 is at the position shown in FIG. 4. FIG. 5 illustrates the position of indicia 6.2 and of ring 6 after a rotation of magnet 3 through 180° from its starting position. FIG. 6 illustrates the position of the parts after rotation of magnet 3 through 270°. FIG. 7 illustrates the rotation of ring 6, and particularly marking or indicia 6.2 thereon, after magnet 3 or, respectively, contact point B, has made a complete revolution through 360°. The greater circumferential distance between marking or indicia 6.2 and contact point B on the inner surface 6.1 of ring 6 has the same length as the entire circumference of the outer periphery 5.21 of shoulder 5.2.

FIG. 8 illustrates that ring travels one quarter of a revolution when magnet 3 travels through 1.25 revolutions. From this there can be deduced the speed ratio $k$ between ring 6 and magnet 3, and this has the following relation:

$$k = \frac{D-d}{D}$$

By proper selection of D and $d$, at a given speed of rotation of shaft 2 or of magnet 3, the speed of ring 6, or, respectively, of marking or indicia 6.2, can be selected so that satisfactory observation of the movement of the marking or indicia 6.2 is insured.

The following dimensions and ratings may be mentioned as an example:

| | | |
|---|---|---|
| Speed of shaft | r.p.m | 1000 |
| Outside diameter $d$ of shoulder 5.2 | mm | 38 |
| Inside diameter D of ring 6 | mm | 40 |
| Speed of ring 6 | r.p.m | 50 |

FIG. 9 illustrates an embodiment of the invention in which the roll-off or roll around body is a hood 7 of paramagnetic soft iron, and having a cylindrical rim whose cylindrical outer periphery 7.1 rolls around the cylindrical inner periphery 8.1 of a circular bore in housing 8. This bore is covered by means of a non-magnetic housing cover 9 projecting into hood 7. Housing 8 rotatably mounts the shaft 2 rotatable about axis 2.1 and carrying a permanent magnet 3 at its end 2.2, projecting into the housing cover 9. Hood 7 is retained in place by means of a headed screw 10 screwed into housing cover 9. The stem 10.1 of screw 10 extends through an aperture 7.2 in hood 7 and has a diameter appreciably less than this aperture, whereas the head 10.2 of the screw has a diameter in excess of the diameter of aperture 7.2.

The mode of operation of the indicating device shown in FIG. 9 is, in principle, the same as the mode of operation of the indicating device shown in FIGS. 1 through 8. The point of contact of hood 7 with bore 8.1 of housing 8 is, however, offset by 180° with relation to pole 3.2 of magnet 3 which magnetically attracts hood 7. Since, in the embodiment of FIG. 9, the diameter of bore 8.1 or, respectively, the roll around path, is greater than the diameter of the roll-off body, respectively the hood 7, the direction of rotation of hood 7 is opposite to that of magnet 3. The design of the roll-off body as a hood has the advantage that a marking or indicia on the end face thereof can be arranged to be well visible from the front.

Figure 10:
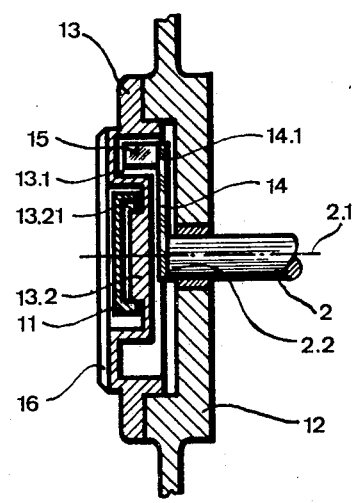
FIG. 10 is a sectional view of an indicating device embodying the invention wherein the indicating member is a hood rolling off a circular track on the exterior of a housing.

FIG. 10 illustrates a further embodiment of the invention which again includes, as the roll-off body, a hood 11 of paramagnetic soft iron. A housing cover 13 of nonmagnetic material is fastened to housing 12, and has a circular cutout or channel 13.1 on its inner surface and a cylindrical shoulder 13.2 on its outer surface. The cylindrical periphery 13.21 of shoulder 13.2 serves as a roll around path for hood 11. Housing 12 again rotatably mounts shaft 2 rotatable above axis 2.1. At the end 2.2 of shaft 2, an arm 14 is fastened and carries, at its end 14.1 spaced from shaft axis 2.1, a permanent magnet 15 extending into cutout or channel 13.1 of housing cover 13. The outside of cover 13 is closed by means of a transparent cover or inspection glass 16.

In the embodiment shown in FIG. 10, roll around path 13.21 and roll around body 11 lie within the orbit described by magnet 15 during rotation of shaft 2. The principle of operation is the same as for the embodiment of the invention shown in FIG. 9. The point of contact of hood 11 with periphery 13.21 is offset by 180° with respect to magnet 15. In the embodiment shown in FIG. 10, the diameter of shoulder 13.2 or, respectively, the roll around path 13.21, is less than the diameter of the circular inner periphery of roll-off body or hood 11. Consequently, hood 11 rotates in the same direction as shaft 2. Inspection glass 16 prevents hood 11 falling out and also prevents deposition of dirt or the like on the roll-off path.

Figure 11:
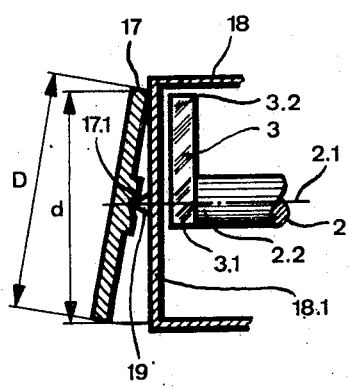
FIG. 11 is a sectional view of an indicating device embodying the invention and wherein the indicating member is a wobble plate whose periphery rolls around an end wall of a housing.

In the embodiment of the indicating device shown in FIG. 11, the roll-off or roll around body comprises a circular wobble plate 17 of paramagnetic soft iron. The rotatable shaft 2 again has a permanent magnet 3 secured to its end 2.2 for rotation about its axis 2.1, the permanent magnet 3 having its pole 3.1 at the axis 2.1 and the other pole 3.2 describing a circular path during rotation of shaft 2. This circular path is directly next to a thin end wall 18.1 of a non-magnetic housing cover 18. Wobble plate 17 is mounted at its center 17.1 on the tip of a cone 19 positioned on end wall 18.1 coaxial with axis 2.1 of shaft 2.

As magnet 3 rotates, the circumference or periphery of wobble plate 17 rolls around end wall 18.1. As the diameter D of wobble plate 17 is greater than the diameter $d$ of the roll-off circle, the wobble plate 17 rotates in the same direction as shaft 2, the speed ratio $k$ again being $$k = \frac{D-d}{D}$$

The somewhat precarious mounting of wobble plate 17 on pivot cone 19 can be avoided by providing the roll-off body as a cone of paramagnetic soft iron.

Figure 12:
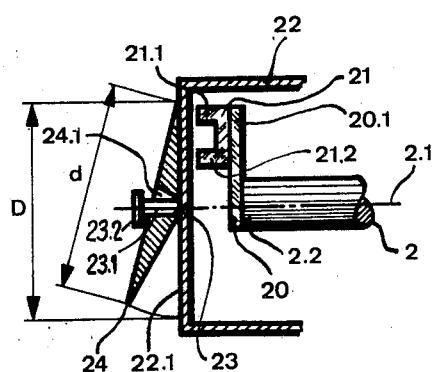
FIG. 12 is a sectional view of an indicating device embodying the invention and wherein the indicting member is a conical-shaped member whose conical surface rolls on the end wall of a housing.

Such a construction is illustrated in FIG. 12 in which the rotatable shaft 2 and having the axis 2.1 is again illustrated. The end 2.2 of shaft 2 has fastened thereto an arm 20 carrying, at its end 20.1 spaced from shaft 2, a horseshoe-shaped permanent magnet 21. The two poles 21.1 and 21.2 of magnet 21 lie directly next to a thin non-magnetic end wall 22.1 of a housing cover 22. A bolt 23 is fastened on end wall 22.1 coaxial with shaft axis 2.1. This bolt has a stem 23.1 and an enlarged head 23.2. Bolt 23 extends through an aperture or bore 24.1 along the axis of a conical-shaped member 24. This bore is conical, and it will be noted that the maximum diameter thereof is in excess of the diameter of stem 23.1, but of the same order or less than the diameter of head 23.2, of bolt 23.

At its point nearest magnet 21, a generatrix of conical-shaped member 24 engages end wall 22.1. In contrast to the wobble plate, the pivot of cone 24 is at the center of the roll-off circle on end wall 22.1. Consequently, the diameter D of the roll-off circle is greater than the diameter $d$ of the base circle of the cone, or, respectively, of the roll-off circumference. Thus, the direction of rotation of conical-shaped member 24 is opposite to that of shaft 2.

The invention is not necessarily limited to the illustrated embodiments. For example, various other forms of magnets may be used. The essential feature is only that the roll-off body is attracted unilaterally. Furthermore, to avoid imbalance, there may be provided a magnet which is rotation-symmetrical with respect to shaft axis 2.1 and magnetized non-symmetrically relative to the shaft axis. Alternatively, a magnet may be installed non-symmetrically in a rotation-symmetrical non-magnetic body. To attain quiet or silent motion of the roll-off body, either the latter, or the roll-off path, or both may be provided with noise damping means.

In the arrangements according to FIGS. 9 and 10, rings may be used instead of hoods and, in the arrangement of FIG. 1, a hood may be used instead of a ring as the roll-off body. The arrangement of magnet 15 as shown in FIG. 10 can also be used when the roll-off path is a circular bore, as illustrated in FIG. 9. In such a case, the direction of rotation of the roll-off body would again be opposite to that of the shaft.

Additionally, the portion of the indicating device exterior to the housing may be covered by a transparent hood. In order to avoid leakage of the lines of flux of the permanent magnet, the latter may be spaced from the shaft by a non-magnetic intermediate portion. In FIG. 11, conical-shaped member 19 may be replaced by a conical design of the housing cover, in which case the wobble plate would rest on a generatrix of the conical housing cover.

What is claimed is:

1. An indicator for the state of movement and direction of rotation of a glandless circulating pump having a rotor and a rotor shaft rotatably mounted in a sealed housing, said indicator comprising, in combination, a magnet rotatable in said housing with said shaft, said magnet having a pole spaced a substantial distance radially from the axis of rotation of said shaft, whereby said pole will follow a first circular path concentric with said axis during rotation of said shaft; a second circular path on an exterior surface of said housing, said second path being continuous and concentric with said axis and at a fixed constant distance from said first circular path; and an indicating member in the form of a rotation-symmetrical body of magnetically permeable material movably engaging said exterior surface of said housing and having a rolling circumference, in engagement with said exterior surface, with a diameter different from said second circular path, said indicating member being provided with a clearly visible indicia; said indicating member, under the magnetic influence of the rotating magnet, being moved with its rolling circumference progressing along said second circular path serving as a rolling path for its rolling circumference.

2. An indicator, as claimed in claim 1, in which said indicating member is a body of soft iron.

3. An indicator, as claimed in claim 1, said housing having an external cylindrical shoulder constituting said second circular path.

4. An indicator, as claimed in claim 1, in which said housing is formed with a circular bore in a wall thereof and constituting said second circular path.

5. An indicator, as claimed in claim 1, in which said indicating member is in the form of a cylindrical ring.

6. An indicator, as claimed in claim 5, in which said housing has a wall formed with a cylindrical shoulder constituting said second circular path, said ring rolling around said shoulder.

7. An indicator, as claimed in claim 1, in which said indicating member is a hood having a cylindrical rim constituting said rolling circumference.

8. An indicator, as claimed in claim 7, in which said housing is formed with an external cylindrical shoulder constituting said second circular path, the cylindrical rim of said hood rolling around said cylindrical shoulder.

9. An indicator, as claimed in claim 1, in which said magnet is disposed within the periphery of said second circular path and within the periphery of the rolling circumference of said indicating member.

10. An indicator, as claimed in claim 1, in which said magnet is disposed outside the periphery of said second circular path and outside the periphery of said rolling circumference.

11. An indicator, as claimed in claim 1, in which said housing has an end wall perpendicular to said axis; said second circular path extending on the exterior surface of said end wall.

12. An indicator, as claimed in claim 11, in which said indicating member is a circular wobble plate; and means on said end wall mounting said wobble plate for wobbling around a point on said axis of rotation.

13. An indicating device, as claimed in claim 11, in which said indicating member is a conical-shaped member having a conical surface engaged with the exterior surface of said end wall during progression of its rolling circumference along said second circular path.

14. An indicating device, as claimed in claim 11, in which the entire magnet follows said first circular path laterally adjacent said end wall and said second circular path.

15. An indicator, as claimed in claim 14 in which said indicating member is a circular wobble plate; and means mounting said wobble plate or wobbling about a point on said axis of rotation.

16. An indicator, as claimed in claim 14, in which said indicating member is a conical-shaped member having a conical surface engaged with the exterior surface of said end wall during progression of its rolling circumference along said second circular path.

17. An indicator, as claimed in claim 1, including a transparent cover enclosing those parts of said indicator on the exterior of said housing.

References Cited

UNITED STATES PATENTS

| | | | |
|---|---|---|---|
| 1,520,985 | 12/1924 | Troseth. | |
| 1,893,090 | 1/1933 | Kreidlee | 116—129 X |
| 2,405,140 | 8/1946 | Grimm. | |
| 2,880,411 | 3/1959 | Van de Ven. | |

LOUIS R. PRINCE, Primary Examiner

D. M. YASICH, Assistant Examiner

U.S. Cl. X.R.

116—136.5